United States Patent [19]
Iida et al.

[11] Patent Number: 5,716,761
[45] Date of Patent: Feb. 10, 1998

[54] DOUBLE-SIDED-MULTI-LAYERED OPTICAL DISC AND A METHOD FOR MANUFACTURING THE SAME

[75] Inventors: Tetsuya Iida; Takanobu Higuchi; Keiji Suga, all of Tsurugashima, Japan

[73] Assignee: Pioneer Electronic Corporation, Tokyo, Japan

[21] Appl. No.: 697,833

[22] Filed: Aug. 28, 1996

[30] Foreign Application Priority Data

Sep. 19, 1995 [JP] Japan .................. 7-240010

[51] Int. Cl.⁶ .................. G11B 7/26; G11B 7/24
[52] U.S. Cl. .................. 430/321; 430/270.11; 430/945; 428/65.2; 156/74; 156/275.5; 156/242; 369/284
[58] Field of Search .................. 430/270.11, 321, 430/945; 369/283, 284; 428/65.2; 156/74, 275.5, 242; 264/106, 107, 1.33, 1.38

[56] References Cited

U.S. PATENT DOCUMENTS

| | | | |
|---|---|---|---|
| 4,179,532 | 12/1979 | Soeding | 369/284 |
| 5,126,996 | 6/1992 | Iida et al. | 369/283 |
| 5,378,517 | 1/1995 | Suzuki et al. | 428/64 |

FOREIGN PATENT DOCUMENTS

| | | | |
|---|---|---|---|
| 61-090343 | 5/1986 | Japan | 264/1.33 |
| 5-020714 | 1/1993 | Japan . | |

*Primary Examiner*—John A. McPherson
*Attorney, Agent, or Firm*—Fish & Richardson P.C.

[57] ABSTRACT

A method for manufacturing a double-sided-multi-layered optical disc. An intermediate substrate having pits on both the major surfaces is previously prepared as well as first and second substrates. The method rotates the first substrate, the intermediate substrate and the second substrate with respect to the common center thereof so as to form unhardened radiation setting resin layers between adjacent substrates so that thicknesses of the unhardened resin layers are adjusted to predetermined values, and then the method irradiates a radiation onto the unhardened resin layer so as to harden the unhardened resin layers to solid resin layers.

10 Claims, 3 Drawing Sheets

DOUBLE-SIDED-MULTI-LAYERED OPTICAL DISC AND A METHOD FOR MANUFACTURING THE SAME

BACKGROUND OF THE INVENTION

1. Field of the Invention

The present invention relates to an optical disc video disc such as a video disc or the like, and particularly to a double-sided-multi-layered optical disc and a method for manufacturing the same.

2. Description of the Related Art

There is known an optical disc manufactured through a method disclosed by Japanese Patent Kokai No. 2-223030 as shown in FIGS. 1A to 1F. Such an optical disc is a single-sided two-layered optical disc in which recorded signals are read from a plurality of recording layers formed on only one side face thereof. For example, the single-sided two-layered optical disc is constructed so that first and second the reflective layer 12 and 15 are formed in turn on a transparent substrate 11 and then a protective layer 16 is formed on the latter as shown in FIG. 1F. Each reflective layer is provided with a plurality of fine recesses or protrusions (also referred to herein as "pits") corresponding to signals to be recorded. This transparent substrate 11 may be formed of a transparent resin material, such as polycarbonate (PC) or polymethyl methacrylate (PMMA) or the like transparent materials. This single-sided two-layered optical disc is manufactured through the following steps.

First, a transparent substrate 11 carrying the first recorded pits P1 is previously formed by using an injection molding method, an injection compression molding method, or a so-called 2P transferring method in which a radiation setting resin (also referred to herein as "2P" or "PP") is used for a transferring layer carrying the pits due to radiation-polymerization.

Next, as shown in FIG. 1A, a first reflective layer 12 is formed on the surface carrying the pits P1 of the substrate 11 by using a vacuum deposition apparatus. The first reflective layer has a property that allows the specific wavelength light to harden the later described unhardened radiation setting resin PP.

Next, a stamper 13 is ready in which the second recorded pits P2 is spirally or concentrically arranged on the surface. The stamper 13 is set up to a 2P transferring apparatus in such a manner that, as shown in FIG. 1A, the pits-carried face is directed upwardly. Then, a fluid unhardened radiation setting resin PP is provided on the pits-carried face of the stamper 13.

Next, a transparent substrate 11 is aligned to the stamper 13 in such a manner that the first reflective layer 12 is directed downwardly. Then, the transparent substrate 11 is placed on the fluid unhardened radiation setting resin PP. As shown in FIG. 1B, the radiation setting resin PP is spread and held between the first reflective layer 12 and the stamper 13.

Next, a radiation is irradiated above to below to transparent substrate 11 under the condition as it is shown in FIG. 1C, so that the radiation setting resin PP on the first reflective layer 12 hardens to form a transparent layer.

After the radiation setting resin fully hardens, as shown in FIG. 1D, the stamper 13 is peeled off the radiation setting resin of the transparent layer. In this way, arranged pits of the stamper 13 is transferred as the second the pits P2 into the transparent layer of solid radiation setting resin.

Next, as shown in FIG. 1E, the reflective layer 15 is formed on the surface carrying the pit P2 of the solid radiation setting resin PP on the substrate 11 by using a vacuum deposition apparatus.

Next, as shown in FIG. 1F, a protective layer 16 of a radiation setting resin is layered for protecting the reflective layer 15. In this way, the single-sided two-layered optical disc is formed which has the layered first and second reflective layer 12 and 15 having wavelength bandwidths in reflecting light different from each other.

there is an idea that a pair of single-sided two-layered optical discs are manufactured through the above method and then they are bonded together in order to make a double-sided four-layered optical disc which is capable of being read out data from the double sides thereof.

However, such a formation of the double-sided four-layered optical disc increases its steps and spends much time, so that its productivity is low. The above mentioned method for manufacturing a multi-layered optical disc optical disc is, in recent years, insufficient to satisfy a demand for the recording of mass information with a high density of pits on the disc during the production with various kinds of data.

SUMMARY OF THE INVENTION

Thus, the present invention has been made to solve such a problem in view of the forgoing status. An object of the invention is to provide a high density optical disc capable of being manufactured through simple processes and a method for manufacturing the same which is suitable to the various kinds production or mass production.

A method for manufacturing an optical disc according to the present invention comprises the steps of:

providing a first circular transparent substrate having two major surfaces one of which is flat, the other having a first data-recorded face of fine recesses or protrusions;

providing an unhardened radiation setting resin onto said first data-recorded face;

providing a circular intermediate substrate having two major surfaces having second and third data-recorded faces of fine recesses or protrusions respectively;

aligning said intermediate substrate to said first circular transparent substrate with respect to centers thereof in a manner that said first data-recorded face faces said second data-recorded face, so as to place said intermediate substrate on said unhardened radiation setting resin provided on said first substrate;

providing an unhardened radiation setting resin onto said third first data-recorded face of said intermediate substrate;

providing a second circular transparent substrate having two major surfaces one of which is flat, the other having a fourth data-recorded face of fine recesses or protrusions;

aligning said second circular transparent substrate to said intermediate substrate with respect to centers thereof in a manner that said third data-recorded face faces said fourth data-recorded face, so as to place said second circular transparent substrate on said unhardened radiation setting resin provided on said intermediate substrate;

rotating said first substrate, said intermediate substrate and the second substrate with respect to the common center thereof so as to form unhardened resin layers of the unhardened radiation setting resins between adjacent substrates so that thicknesses of the unhardened resin layers are adjusted to predetermined values; and irradiating a radiation onto said unhardened resin layer so as to harden said unhardened resin layers to solid resin layers.

A double-sided-multi-layered optical disc according to the present invention comprises:
- a first circular transparent substrate having two major surfaces one of which is flat, the other having a first data-recorded face of fine recesses or protrusions;
- a second circular transparent substrate having two major surfaces one of which is flat, the other having a fourth data-recorded face of fine recesses or protrusions;
- a circular intermediate substrate having two major surfaces having second and third data-recorded faces of fine recesses or protrusions respectively, which is disposed between said first and fourth data-recorded faces of said first and second substrates;
- first and second solid resin layers adhering said first data-recorded face to said second data-recorded face and said third data-recorded face to said fourth data-recorded face respectively; and
- said first and second solid resin layers which are formed in a manner that, after unhardened radiation setting resins are provided between said intermediate substrate and said first and between said intermediate substrate and said second substrate respectively, these substrates are aligned with respect to centers thereof and rotated with respect to the common center thereof so as to form unhardened resin layers of the unhardened radiation setting resins between adjacent substrates so that thicknesses of the unhardened resin layers are adjusted to predetermined values and are irradiated with a radiation onto said unhardened resin layer to harden said unhardened resin layers.

In an embodiment of the present invention, reflective layers are formed on said data-recorded faces of said first substrate, said intermediate substrate and said second substrate respectively.

An advantage of the present invention is that it provides, because the intermediate substrate having pits on both the major surface is previously prepared, the cost for the manufacture is reduced and the time for the manufacture is shortened in comparison with the prior art which including the step of bonding a pair of single-sided two-layered optical discs to make a double-sided four-layered optical disc. In other words, the present invention includes the step of forming a pair of the transparent substrates each having pits and the reflective layers, of forming the intermediate substrate having pits and the reflective layers at both the sides, and of bonding these substrates by using a so-called 2P spin-coating method so that the intermediate substrate is sandwiched via 2P layers between the pair of transparent substrates, whereby the double-sided four-layered optical disc is obtained.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF THE PREFERRED EMBODIMENTS

Figure 1A:
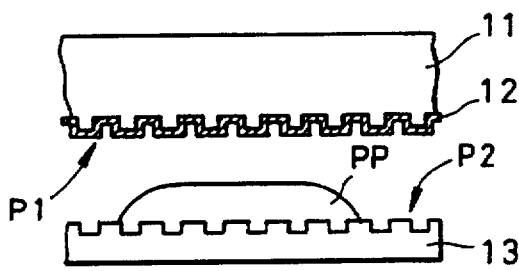
FIGS. 1A to 1F are schematic sectional views of substrates for illustrating a method for manufacturing an optical disc in the prior art.
Figure 1B:
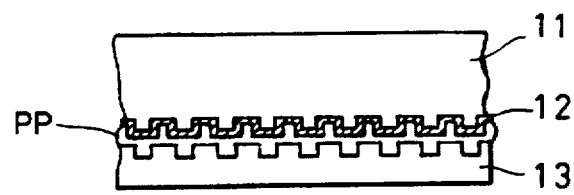
Figure 1C:
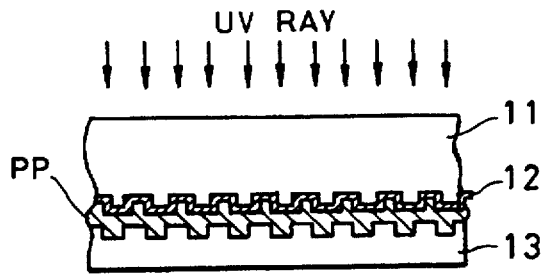
Figure 1D:
Figure 1E:
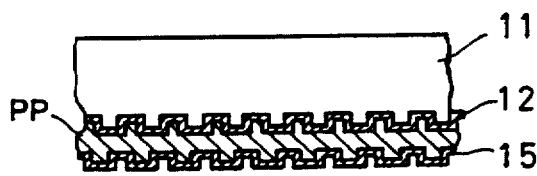
Figure 1F:
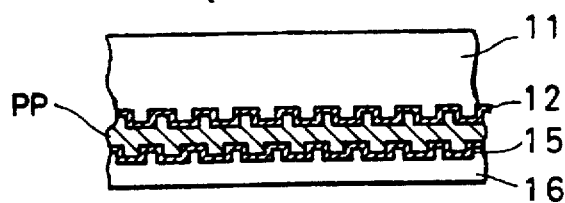

The embodiments according to the present invention will be described in more detail with reference to the accompanying drawings.

There are previously prepared a pair of circular transparent substrates as first and second substrates. Each substrate is made of a transparent resin such as PMMA, PC or the like and has two major surfaces one of which is flat, the other having a first data-recorded face of fine recesses or protrusions. Each transparent substrate is manufactured by an injection-molding method in which the first recorded pit-row in the first data-recorded face is spirally or concentrically formed at the major surface by using a stamper on which inverse pit-row is arranged. In addition to the injection-mold method, the first and second substrates may be manufactured by the 2P transferring method in which a transfer layer of 2P with first pits is formed on a flat transparent substrate by a stamper of Nickel with arranged inverse pits.

Next, a metallic material such as Gold (Au), Aluminum (Al), Titanium (Ti), Silicon (Si) or the alloy including at least one of the individuals thereof is vacuum-vapor-deposited on the surface carrying pits of the substrate by using a vacuum deposition apparatus to form the first reflective layer for the first data-recorded face. The light-transmittance of the reflective layer may be adjusted by the variation of its thickness performed through a vacuum-vapor-deposition or sputtering process.

Moreover, the first reflective layer may be form as another metallic layer or dielectric multi-layered reflective layer having a radiation transparency of a necessary wavelength band for transmitting a predetermined wavelength light to harden a radiation setting resin in the next step. The dielectric multi-layered reflective layer is formed in such a manner that high refractive index material layers and low refractive index material layers are alternatively layered with a thickness pitch of lambda/4 (lambda denotes a wavelength of laser light for reading data). The high refractive index material layers are selected from $PbO_2$, $ZrO_2$, $TiO_2$ or the like. The low refractive index material layers are selected from $SiO_2$, $MgF_2$, $Al_2O_3$ or the like. The dielectric multi-layered reflective layer provides a variety of the reflective layers having a specific wavelength bandwidth by sifting the thickness of each reflective layer and/or by combining several reflective layers having different wavelength bandwidths, so that the reflected light may be optionally selected. For example, the first reflective layer of dielectric multi-layered type may have a reflective property so that an approximately 800 nm wavelength light is reflected and other lights of an approximately 600 nm or less wavelength are transmitted.

Next, a circular intermediate substrate is previously prepared so as to bear fine recesses or protrusions on both major surface sides as data-recorded faces. The intermediate substrate may have preferably a thickness of 180 micrometers or less in order to secure at least 0.66 mm thickness of the transparent substrate half including a radiation setting resin layer, even if the double-sided four-layered optical disc has a maximum thickness of 1.5 mm. The intermediate substrate may be made of a transparent material selected form a group of polycarbonate (PC), polypropylene (PP), polymethyl methacrylate (PMMA), polystyrene (PS), polyvinyl chloride (PVC), amorphous-polyolefin (a-PO), polyethylene (PE), polybutadiene (PB) and polyethylene terephthalate (PET) or the like. Both the data-recorded faces in sides of the intermediate substrate are coated with Aluminum (Al) by using a vacuum deposition apparatus or sputtering apparatus to form the reflective layers. In addition, the reflective layer may be formed as the dielectric multi-layered. The intermediate substrate is formed by using a method selected from an injection molding method, an injection compression molding method or a compression method. The injection molding method is performed in such a manner that a pair of stampers each having a recorded pit face are spaced at a predetermined distance as facing each other to define a molding cavity into which a melted resin is injected. The injection compression molding method is performed in such a manner that a pair of stampers each having a recorded pit face are spaced at a distance increased by 0.05–0.1 mm over a predetermined one as facing each other to define a molding cavity into which a melted resin is injected and then compressed to the predetermined thickness. The compression method is performed in such a manner that a polymer resin film or sheet is stamped at the both sides by a pair of stampers each having a recorded pit face to transfer the recorded pit face into the polymer resin film or sheet to perform the trimming for a circular disk.

In addition to the resin disk, the intermediate substrate may be formed of a metallic material selected form a group of Gold, Silver, Copper, Aluminum, Titanium, Tin, Platinum and the alloy including at least one of the individual thereof. In this case, the formation of the reflective layer is unnecessary. The metallic intermediate substrate is formed by using the compression method or rolling method in which the recorded pit face is formed by the stamping of the stampers.

In this way, the first and second substrates and the intermediate substrate previously prepared. In the preferred embodiment, the double-sided four-layered optical disc is manufactured which comprises the two reflective layers having wavelength bandwidths in reflecting light different from each other per one side.

Figure 2A:
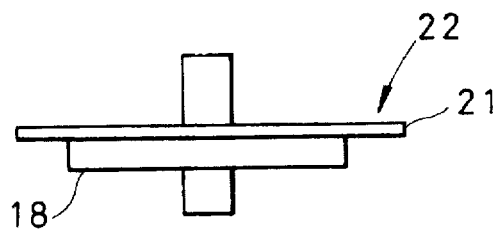
FIGS. 2A to 2G are schematic sectional views of substrates for illustrating a method for manufacturing an optical disc according to the present invention.

First, the first substrate 21 is set up to the spindle turntable 18 of a transferring apparatus in a manner that a first data-recorded face of the first reflective layer 22 is directed upwardly as shown in FIG. 2A.

Figure 2B:
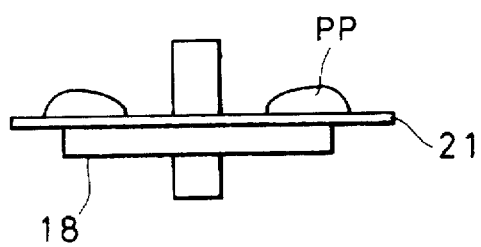

After that, as shown in FIG. 2B, a fluid unhardened radiation setting resin PP is provided onto the first reflective layer 22.

Figure 2C:
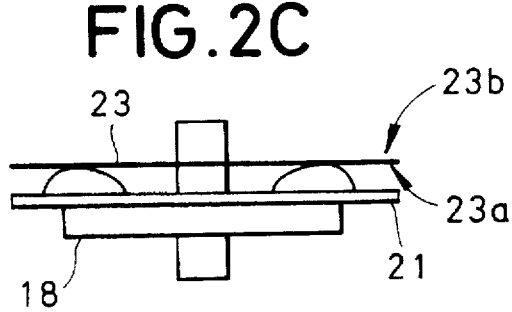

Next, as shown in FIG. 2C, the intermediate substrate 23 having two major surfaces having second and third data-recorded faces of reflective layers 23a, 23b of fine recesses or protrusions respectively is placed on the fluid unhardened radiation setting resin PP in a manner that the first reflective layer 22 faces the second reflective layer 23a while aligning the intermediate substrate 23 to the first substrate 21 with respect to centers thereof.

Figure 2D:
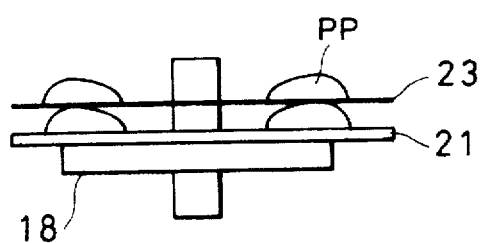
Figure 2E:
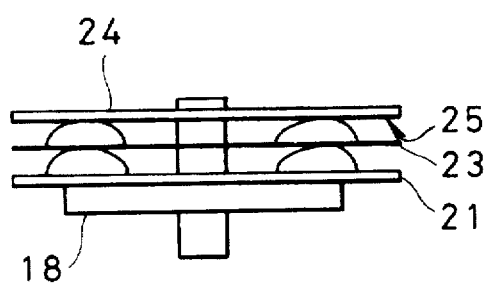

Next, as shown in FIG. 2D, a fluid unhardened radiation setting resin PP is provided onto the third data-recorded face 23b of the intermediate substrate 23.

Next, as shown in FIG. 2 E, the second substrate 24 having fourth data-recorded face of reflective layer 25 is placed on the fluid unhardened radiation setting resin PP in a manner that the reflective layer 25 faces the third reflective layer 23b while aligning the second substrate 24 to the intermediate substrate 23 with respect to centers thereof. In this way, the intermediate substrate is disposed and held via radiation setting resins PP between the reflective layers 22, 25 of the first and second substrates 21, 24.

Figure 2F:
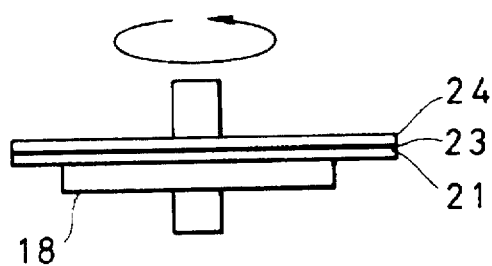

Next, as shown in FIG. 2F, the first substrate 21, the intermediate substrate 23 and the second substrate 24 are rotated by the spindle turntable 18 as a whole with respect to the common center of the spindle so as to Extra fluid unhardened radiation setting resins are severed by rotation. This rotation forms fluid unhardened resin layers between adjacent substrates so that thicknesses of the unhardened resin layers are adjusted to predetermined values by controlling of the provided amount of the unhardened radiation setting resin and the speed and duration of rotation for the spindle turntable.

Figure 2G:
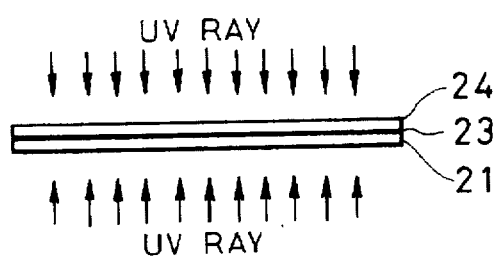

After the adjustment of thicknesses of the unhardened resin layers, as shown in FIG. 2G, the unhardened radiation setting resin is irradiated with a radiation such as a UV-ray to be hardened to form solid resin layers inserted between the first substrate 21 and the intermediate substrate 23 and between the intermediate substrate 23 and the second substrate 24. In this case, a radiation setting resin may be a UV-ray setting resin. The radiation of UV-rays is performed from the both sides of the first substrate 21 and the second substrate 24 at the same time, and alternatively these substrates may be irradiated in turn.

Figure 3:
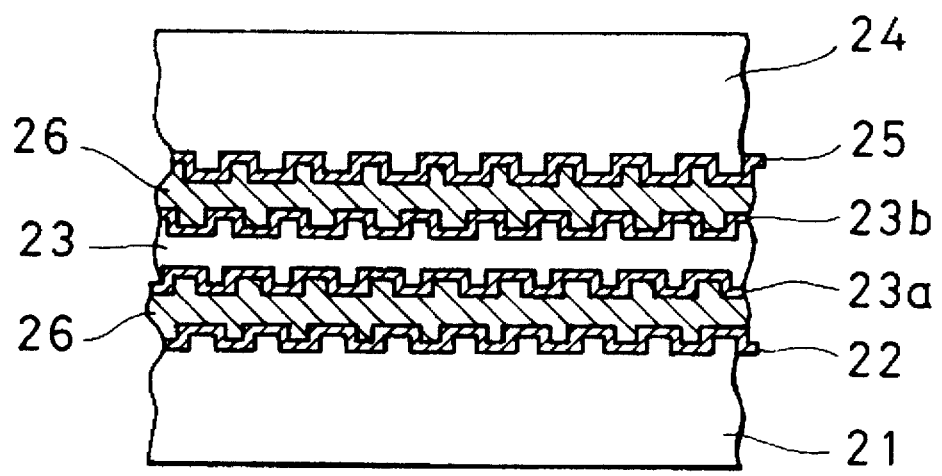
FIG. 3 is a schematic sectional view of a double-sided four-layered optical disc according to the present invention.

As a result, as shown in FIG. 3, there is manufactured a double-sided four-layered optical disc comprising the first substrate 21, the intermediate substrate 23 and the second substrate 24 and solid transparent resin layers 26 adhering the first data-recorded face to the second data-recorded face and the third data-recorded face to the fourth data-recorded face respectively.

According to the present invention, the intermediate substrate having pits on both the major surfaces is previously prepared as well as the first and second substrates, these substrates are bonded by using the so-called transferring method so that the intermediate substrate is sandwiched via radiation setting resin layers between the pair of transparent substrates. Therefore, the double-sided four-layered optical disc is manufactured with a relatively low cost and the time for the manufacture is shortened to improve a recording density of data. Furthermore, there is easily achieved an optical disc capable of storing a large quantity data because of having a plurality of the layered reflective layers of data-recorded faces.

It should thus be apparent that the scope of the teaching of this invention is not intended to be limited by only the embodiments that have been expressly disclosed and illustrated, but that instead the scope of the teaching of this invention should be read as being commensurate with the scope of the claims that follow.

What is claimed is:

1. A method for manufacturing an optical disc comprising the steps of:
providing a first circular transparent substrate having two major surfaces one of which is flat, the other having a first data-recorded face of fine recesses or protrusions;
providing an unhardened radiation setting resin onto said first data-recorded face;
providing a circular intermediate substrate having two major surfaces having second and third data-recorded faces of fine recesses or protrusions respectively;
aligning said intermediate substrate to said first circular transparent substrate with respect to centers thereof in a manner that said first data-recorded face faces said second data-recorded face, so as to place said intermediate substrate on said unhardened radiation setting resin provided on said first substrate;

providing an unhardened radiation setting resin onto said third first data-recorded face of said intermediate substrate;

providing a second circular transparent substrate having two major surfaces one of which is flat, the other having a fourth data-recorded face of fine recesses or protrusions;

aligning said second circular transparent substrate to said intermediate substrate with respect to centers thereof in a manner that said third data-recorded face faces said fourth data-recorded face, so as to place said second circular transparent substrate on said unhardened radiation setting resin provided on said intermediate substrate;

rotating said first substrate, said intermediate substrate and the second substrate with respect to the common center thereof so as to form unhardened resin layers of the unhardened radiation setting resins between adjacent substrates so that thicknesses of the unhardened resin layers are adjusted to predetermined values; and irradiating a radiation onto said unhardened resin layer so as to harden said unhardened resin layers to solid resin layers.

2. A method for manufacturing an optical disc according to claim 1, further comprising reflective layers formed on said data-recorded faces of said first substrate, the intermediate substrate and the second substrate respectively.

3. A method for manufacturing an optical disc according to claim 1, wherein said intermediate substrate is made of a transparent material selected from a group of polycarbonate, polypropylene, polymethyl methacrylate, polystyrene, polyvinyl chloride, amorphous-polyolefin, polyethylene, polybutadiene and polyethylene terephthalate.

4. A method for manufacturing an optical disc according to claim 3, wherein said intermediate substrate is formed by using a method selected from an injection molding method, an injection compression molding method or a compression method.

5. A method for manufacturing an optical disc according to claim 1, wherein said intermediate substrate is formed of a metallic material selected from a group of Gold, Silver, Copper, Aluminum, Titanium, Tin, Platinum and an alloy including at least one of the individual thereof.

6. A method for manufacturing an optical disc according to claim 5, wherein said metallic intermediate substrate is formed by using the compression method or rolling method.

7. A double-sided-multi-layered optical disc comprising:

a first circular transparent substrate having two major surfaces one of which is flat, the other having a first data-recorded face of fine recesses or protrusions;

a second circular transparent substrate having two major surfaces one of which is flat, the other having a fourth data-recorded face of fine recesses or protrusions;

a circular intermediate substrate having two major surfaces having second and third data-recorded faces of fine recesses or protrusions respectively, which is disposed between said first and fourth data-recorded faces of said first and second substrates;

first and second solid resin layers adhering said first data-recorded face to said second data-recorded face and said third data-recorded face to said fourth data-recorded face respectively; and said first and second solid resin layers which are formed in a manner that, after unhardened radiation setting resins are provided between said intermediate substrate and said first and between said intermediate substrate and said second substrate respectively, these substrates are aligned with respect to centers thereof and rotated with respect to the common center thereof so as to form unhardened resin layers of the unhardened radiation setting resins between adjacent substrates so that thicknesses of the unhardened resin layers are adjusted to predetermined values and are irradiated with a radiation onto said unhardened resin layer to harden said unhardened resin layers.

8. A double-sided-multi-layered optical disc according to claim 7, further comprising reflective layers formed on said data-recorded faces of said first substrate, the intermediate substrate and the second substrate respectively.

9. A double-sided-multi-layered optical disc according to claim 7, wherein said intermediate substrate is made of a transparent material selected from a group of polycarbonate, polypropylene, polymethyl methacrylate, polystyrene, polyvinyl chloride, amorphous-polyolefin, polyethylene, polybutadiene and polyethylene terephthalate.

10. A double-sided-multi-layered optical disc according to claim 7, wherein said intermediate substrate is formed of a metallic material selected from a group of Gold, Silver, Copper, Aluminum, Titanium, Tin, Platinum and an alloy including at least one of the individual thereof.

* * * * *